United States Patent
Kraft

(10) Patent No.: US 7,224,989 B2
(45) Date of Patent: May 29, 2007

(54) COMMUNICATION TERMINAL HAVING A PREDICTIVE TEXT EDITOR APPLICATION

(75) Inventor: Christian Kraft, Hvidovre (DK)

(73) Assignee: Nokia Corporation, Espoo (FI)

( * ) Notice: Subject to any disclaimer, the term of this patent is extended or adjusted under 35 U.S.C. 154(b) by 767 days.

(21) Appl. No.: 10/137,416

(22) Filed: May 3, 2002

(65) Prior Publication Data

US 2003/0073451 A1   Apr. 17, 2003

(30) Foreign Application Priority Data

May 4, 2001   (GB) ................... 0111012.1

(51) Int. Cl.
*H04Q 7/20* (2006.01)
(52) U.S. Cl. .................. 455/466; 455/566; 715/536; 704/8
(58) Field of Classification Search ............. 345/171, 345/168, 172; 715/531, 536, 780, 53, 703, 715/745; 704/8; 455/418, 420, 414.1, 466, 455/566
See application file for complete search history.

(56) References Cited

U.S. PATENT DOCUMENTS

| | | | |
|---|---|---|---|
| 5,953,541 A * | 9/1999 | King et al. ............. | 710/67 |
| 6,223,059 B1 * | 4/2001 | Haestrup ............... | 455/566 |
| 6,308,087 B1 * | 10/2001 | Aoshima ............... | 340/7.28 |
| 6,415,250 B1 * | 7/2002 | van den Akker ....... | 704/9 |
| 6,542,170 B1 * | 4/2003 | Williams et al. ....... | 715/816 |
| 6,631,500 B1 * | 10/2003 | Kumhyr ................ | 715/531 |
| 2005/0060138 A1 * | 3/2005 | Wang et al. ............ | 704/1 |

FOREIGN PATENT DOCUMENTS

| | | |
|---|---|---|
| EP | 1014277 | 6/2000 |
| EP | 1031914 | 8/2000 |
| WO | 97/43707 | 11/1997 |

OTHER PUBLICATIONS

European Search Report.

* cited by examiner

*Primary Examiner*—Duc M. Nguyen
*Assistant Examiner*—Anthony S. Addy
(74) *Attorney, Agent, or Firm*—Banner & Witcoff, Ltd.

(57) ABSTRACT

A communication terminal has a predictive text editor for use in a dialogue application. The communication terminal comprises a transceiver unit through which said communication terminal is connected with a network and being able to receive a dialogue input. Language information is identified in said dialogue input. A directory language is automatically selected for said predictive text editor according to the identified language. The predictive text editor uses the selected directory language for transforming a string of ambiguous keystrokes entered by the user into text for said dialogue application.

24 Claims, 4 Drawing Sheets

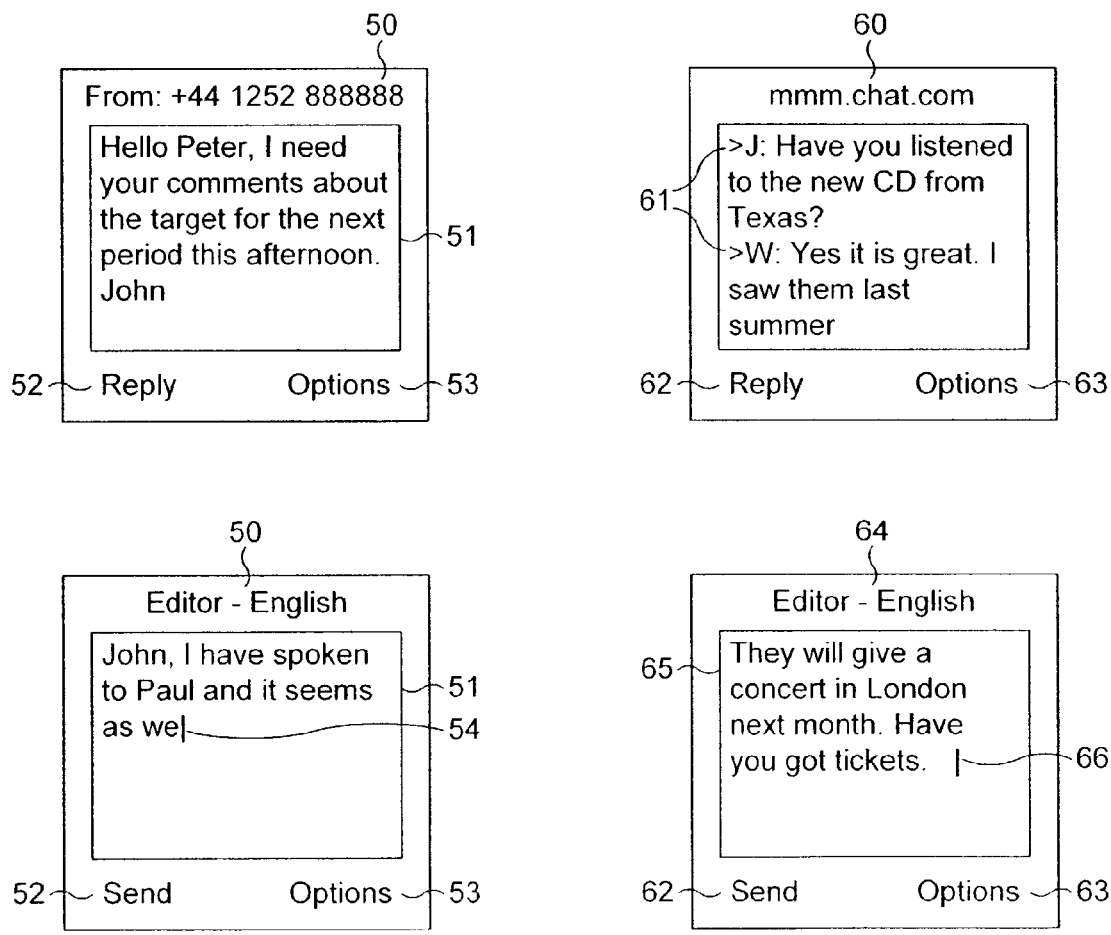

COMMUNICATION TERMINAL HAVING A PREDICTIVE TEXT EDITOR APPLICATION

BACKGROUND OF THE INVENTION

1. Field of the Invention

The invention relates to a communication terminal, for example, a cellular or cordless phone or a communicator, having a predictive text editor application for entering and editing data.

2. Description of the Prior Art

A predictive test editor is widely used in hand-portable terminals with a few alphanumerical keys, each representing a number of letters—for example, two–four letters and one of the numbers 0–9.

The user is able to manually set the directory language to be used by the editor. In some cases a phone manufacturer sets the language to be English as default or simply sets the predictive text editor off as default. Then the user has to change the editor from the multi-tab editor to the predictive editor, and also set the desired language.

The directory is language specific and it contains sets of strings occurring in the language. U.S. Pat. No. 5,818,437 and WO 98/33111 describe this kind of directory. The user is not able to write an English text by using, for example a German directory.

Predictive editors have therefore not been used for dialogue between two parties when E-mailing or chatting, or between for example, an Internet based server and a mobile communication terminal.

SUMMARY OF THE INVENTION

According to a first aspect of the invention, there is provided a method of controlling a directory language for a predictive editor used in dialogue applications. The method comprises reception of a dialogue input, identification of language information from the dialogue input, setting the directory language for the predictive editor according to the identified language, and using the predictive editor for entering input in the dialogue. As a result, the terminal is able to detect the language of the dialogue and change the directory language for the terminal to the detected language for the dialogue.

This feature is advantageous when the dialogue application is a mobile Internet related application, and by a content provider via a network connection provides the language information. This may be the case for a WAP application where the user may enter a text into the terminal as response to down-load mobile Internet content.

Furthermore the dialogue application may be a message related application—for example an E-mail, an SMS or a SMS based chat session—and the language information is specified by a party initiating the dialogue application via a network connection. According to the preferred embodiment, the language information is identified by analyzing a text string contained in a message received as dialogue input.

The analyzing of the text contained in the message received as a dialogue input may preferably comprise steps of converting the message text words into strings of ambiguous key strokes, generating a candidate list for the message text words by means of the predictive editor using a language dependent directory based on the strings of ambiguous key strokes, comparing the candidate list with the original message text word, and selecting the language dependent directory in the dialogue application when the comparison indicates a substantial matching between the message text words and the corresponding candidate lists.

A further aspect of the invention is a communication terminal having a predictive editor for use in a dialogue application. This communication terminal comprises a transceiver unit through which the communication terminal is connected with a network and being able to receive a dialogue input, means for identifying language information in the dialogue input, means for selecting a directory language for the predictive editor according to the identified language and the predictive editor uses the selected directory language for transforming a string of ambiguous key strokes entered by the user into text for the dialogue application.

BRIEF DESCRIPTION OF THE INVENTION

For a better understanding of the present invention and to understand how the same may be brought into effect reference will now be made, by way of example only, to accompanying drawings, in which:

FIG. 1 schematically illustrates a preferred embodiment of a hand portable phone according to the invention.

FIG. 2 schematically shows the essential parts of a telephone for communication with for example a cellular network.

FIG. 5 shows a display sequence for a message reply scenario in a communication terminal according to the invention.

FIG. 6 shows a display sequence for an Internet based chat scenario in a communication terminal according to the invention.

DETAILED DESCRIPTION OF THE INVENTION

Figure 1:
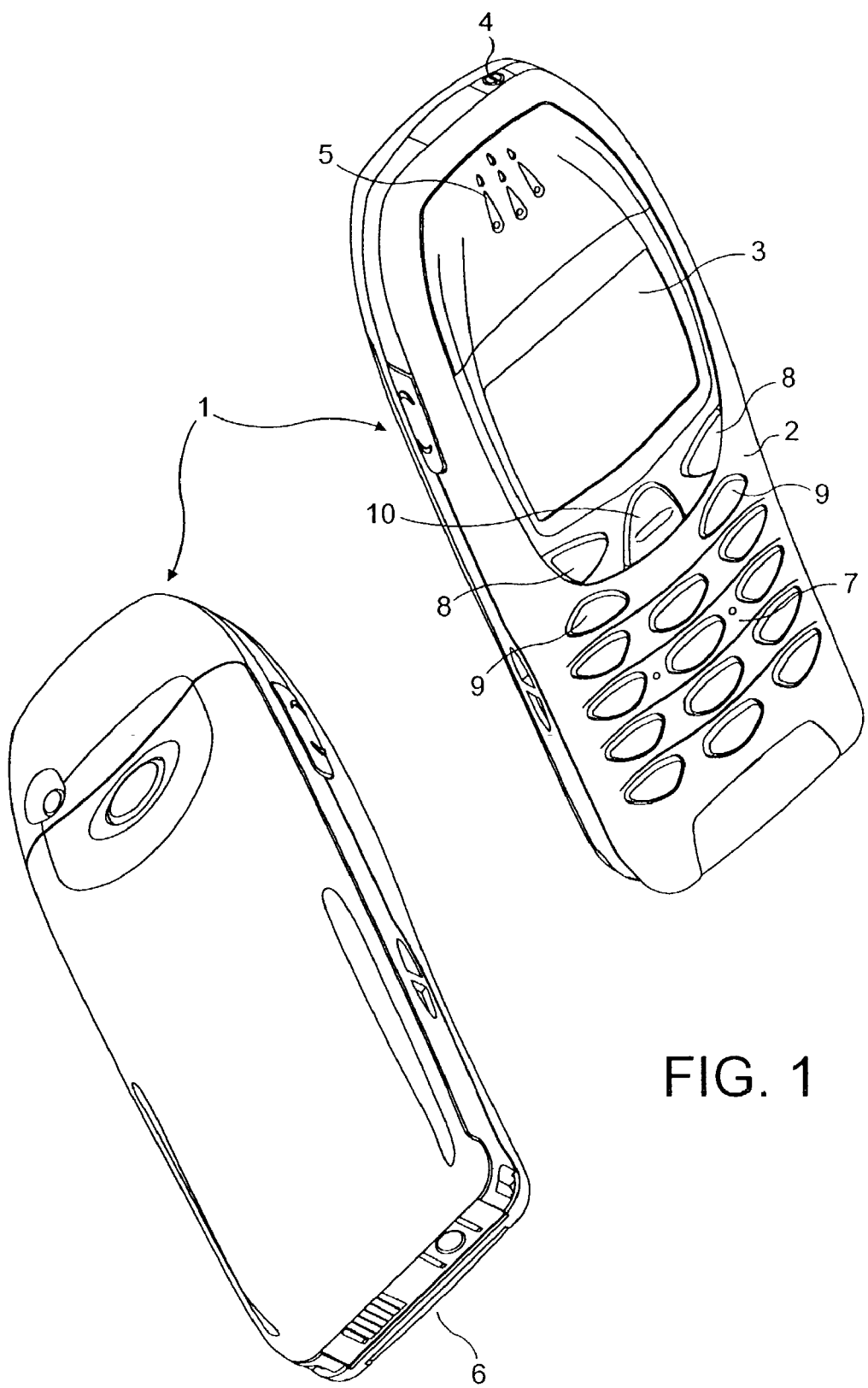

FIG. 1 shows a preferred embodiment of a phone according to the invention, and it will be seen that the phone, which is generally designated by 1, comprises a user interface having a keypad 2, a display 3, an on/off button 4, a speaker 5 (only openings are shown), and a microphone 6 (only openings are shown). The phone 1 according to the preferred embodiment is adapted for communication via a cellular network, but could have been designed for a cordless network as well. The invention could be used in any type of device having an editor and ambiguous alphanumeric keys.

According to the preferred embodiment, the keypad 2 has a first group 7 of keys as alphanumeric keys, two soft keys 8, and a navigation key 10. Furthermore the keypad includes two call-handling keys 9 for initiating and terminating calls. The present functionality of the soft keys 8 is shown in separate fields in the display 3 just above the keys 8. This key layout is characteristic of for example the Nokia 6210™ phone.

Figure 2:
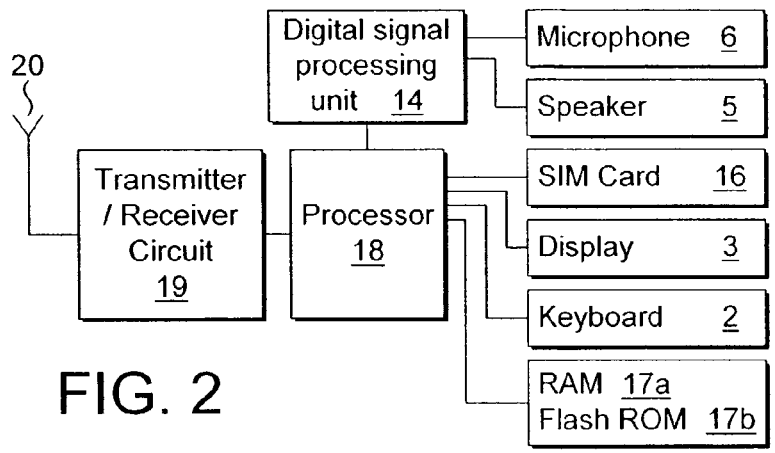

FIG. 2 schematically shows the most important parts of a preferred embodiment of the phone, the parts being essential to the understanding of the invention. A processor 18, which supports the GSM terminal software, controls the communication with the network via the transmitter/receiver circuit 19 and an antenna 20.

The microphone 6 transforms the user's speech into analog signals; the signals formed thereby are A/D converted in an A/D converter (not shown) before the speech is encoded in an audio part 14. The encoded speech signal is transferred to the processor 18. The processor 18 also forms the interface to a RAM memory 17a and a Flash ROM memory 17b, a SIM card 16, the display 3 and the keypad 2 (as well as data, power supply, etc.). The audio part 14 speech-decodes the signal, which is transferred from the processor 18 to the earpiece 5 via a D/A converter (not shown).

Basic Operation of the Predictive Text Editor

Figure 3:
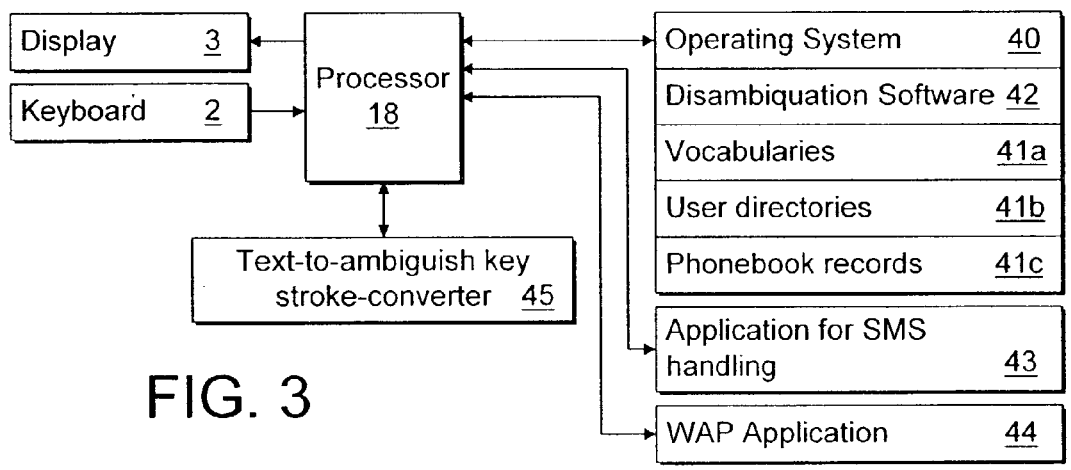
FIG. 3 shows the major components of the predictive text editor according to a preferred embodiment of the invention.

FIG. 3 shows the major components of the predictive text editor according to the invention. The display 3 and the keyboard 2 establish the man-machine interface. The processor 18 executes instructions and reads data from and writes data in the memory 17b. Software instructions in the memory 17b include an operating system 40, a disambiguation program 42 and its vocabularies 41a–c, and optionally one or more application programs, such as an SMS message handling application 43, and a WAP browser application 44.

Target application programs for the predictive text editor used in a handset include the electronic phone book memory, notepad, messages, calendar, and Internet browsing.

When the processor 18 receives a dialogue invitation from an external author (content provider), the processor 18 checks whether a kind of language indication is included in the dialogue invitation. If this is the case, the language identified from the language indication is set as language used by the predictive editor. If no language indication accompanies the dialogue invitation, a text-to-ambiguous key stroke-converter 45 in FIG. 3 generates a string of ambiguous keystrokes based the received text in the dialogue invitation. The processor 18 feeds these strings of ambiguous keystrokes to the predictive editor, and receives as a response sets of matching candidates fitting the inputted string for each word. For each word the processor 18 compares the words in the received text in the dialogue invitation with the sets of matching candidates fitting the inputted string. If a match is deemed to be present, the process determines the language test to be the language of the dialogue invitation and sets this language to be the language of the dictionary used by the predictive editor. If a match is not found, the next directory language is tested. This is repeated until a match is found or no match is found and no further languages are available. If no match can be found, the user is invited to manually set the dictionary used by the predictive editor, or to use a multi-tap method where for example three taps of a key will identify the third letter of this key to be inserted.

System Architecture

Figure 4:
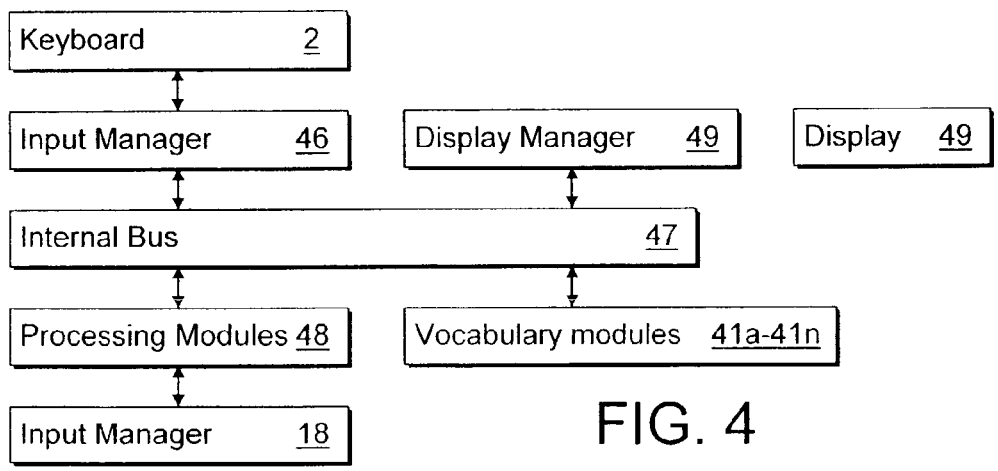
FIG. 4 shows the architecture of ambiguity eliminating software according to a preferred embodiment of the invention.

FIG. 4 shows the architecture of the disambiguating software. An input from a keypad 2 is processed in an input manager 46. Input data is via internal bus 47 passed to a processing module 48, which keeps a record of the current key sequence until the user has accepted a word based on this sequence by pressing the space key, e.g. being present by short pressing (shorter than e.g. 0.8 sec) the "0" key of alphanumeric keys. When a key stroke has been received by the processing module 47, the current key sequence is communicated via internal bus 47 to a processor 18 (preferably being the same processor as the processor 18), which forwards the sequence to one or more modules 41 acting as electronic vocabularies.

The vocabulary modules 41a, 41b, 41c, . . . 41n work in parallel and respond individually if they contain data matching the current keystroke sequence. One vocabulary module 41a might include a dictionary containing words in a language, for example English, defined by the user and used as editing language. The vocabulary modules 41a, 41b, 41c, . . . 41n often supply a plurality of matching words—either being displayed or available through a selection list.

The processor 18 accumulates a complete list of matching words and character strings, as long as the number of keystrokes in the ambiguous string of keystrokes does not exceed a predetermined value, for the selection list. When the processor 18 has finalized the processing, the processing module 47 transfers the selection list to a display manager 49 and the display 3 via the internal bus means 47.

In the most cases, the disambiguation software will work as an editor server and therefore pass data strings directly to another client or application program 43, 44 running on the processor 18, too. In this case, the keypad 2, the input processor 46 and the display manager 49 will be integrated in the application program 43, 44 using the predictive text editor as a server. These applications may include the electronic phone book memory, notepad, messages, calendar, and Internet browsing.

Table 1 shows a preferred key layout of the alphanumeric keys 7. When starting to type a word, the user simply presses the digit key containing the desired letter once.

TABLE 1

| Layout of the alphanumeric keys 7. | | | | | |
|---|---|---|---|---|---|
| 1 | 65 | 2 abc | | 3 def | |
| 4 ghi | | 5 jkl | | 6 mno | |
| 7 pqrs | | 8 tuv | | 9 wxyz | |
| * + | 66 | 0 ⌣ | 67 | # ⇑ | |

If the user wants to type the word "case", he must press the following keys (once) "2 abc" to insert the "c", "2 abc" to insert the "a", "7 pqrs" to insert the "s", "3 def" to insert the "e", and finally the space key 67 in order to prepare for a new word.

Identifying Language of a Received SMS or from a Downloaded WAP/XHTML Page

When a communication terminal receives data according to the preferred embodiment of the invention—either as an SMS or as a downloaded WAP/XHTML page or as other types of files—the processor will convert this data, probably being available as a string of ASCII characters, into a string of ambiguous key strokes. For instance this means that the letters used in the text is replaced by the corresponding keys 2–9 according to table 1. Then the processor starts to convert the string of ambiguous key strokes back to a string of ASCII characters using the language dependent predictive editor. The languages available for the predictive editor are automatically ranked in advance. The first language to be tested for match is the language selected by the user as the preferred language for the predictive editor. A phone sold in the Scandinavian countries may have the following six language directories available for the predictive editor:

English
Danish
Swedish
Norwegian
Finnish
Turkish

If, for example, Danish is the preferred language set by the user, the processor tests this language for match. This language may be Danish. Then the processor will test English due to it widely being used. When a language has been selected as preferred language for the predictive editor, the processor may set a flag indicating this setting. If one or more further languages previously have been selected as preferred languages for the predictive editor, the processor tests the most recent selected language and so on. Finally the remaining languages are tested randomly. The test is stopped when a language directory is deemed to provide a match. This may be the case, for example, when a certain part out of the predetermined words in the text is recognised. This may be 90% out of 10 words (or all the words when less than 10).

With reference to FIG. 5, a sixteen-word text sequence is received.

"Hello Peter, I need your comments about the target for the next period this afternoon. John"

This text is in English, but as indicated above the processor will start testing the Danish language if this is selected preferred language for the predictive editor.

Table 2 shows the text received in FIG. 5 in the dialogue invitation, the generated string of ambiguous key stroke based the received text in the dialogue invitation, and an indication of whether matching may be found by using the Danish and the English. Furthermore the table includes an explanation of the matches.

TABLE 2

Matching in Danish and English language based on ambiguous keystrokes

| Received words | Ambiguous key strokes | Danish | English | Comments |
|---|---|---|---|---|
| Hello | 4-3-5-5-6 | OK | OK | Loan word from English |
| Peter | 7-3-8-3-7 | OK | OK | Probably available from phonebook |
| I | 4 | OK | OK | Different meaning in the two languages |
| need | 6-3-3-3 | — | OK | |
| your | 9-6-8-7 | — | OK | |
| comments | 2-6-6-6-3-6-8-3 | — | OK | |
| about | 2-2-6-8-8 | — | OK | |
| the | 8-4-3 | OK | OK | Different meaning in the two languages |
| target | 8-2-7-4-3-8 | — | OK | |
| for | 3-6-7 | OK | OK | Same meaning in the two languages |

When the processor tests for words matching the string of ambiguous key strokes, the string 3-6-7 will with the Danish directory give the following matching candidates "for", "før", "ens" and "dør". When one of the matching candidates corresponds to the received word, a match is deemed to be detected for this received word.

The processor will see that only five out of ten words are recognized and continue with testing the English directory. Here all words are recognized and the processor will deem the language of the received data to be identified as English and stop the testing.

Guessing Language of WAP/XHTML Pages

The specification of XHTML™ 1.0 (The Extensible HyperText Markup Language) is a reformulation of HTML 4 in XML 1.0. The coming versions of WAP (Wireless Application Protocol) specification will assume features from the XHTML specification.

XHTML supports a language indication, and this indication is formed as an attribute called "lang".

lang=language-code [CI"

This attribute specifies the base language of an element's attribute values and text content. The default value of this attribute is unknown.

Language information specified via the lang attribute may be used by a user agent to control rendering in a variety of ways. Basically, the author supplies language information to the user. According to one aspect of the invention the phone used for browsing in data provided by the author may use a language dependent editor for entering into a dialogue with the author.

The lang attribute specifies the language of element content and attribute values; whether it is relevant for a given attribute depends on the syntax and semantics of the attribute and the operation involved.

The intent of the lang attribute is to allow user agents to render content more meaningful based on accepted cultural practice for a given language. This does not imply that user agents should render characters that are atypical for a particular language in less meaningful ways; user agents must make a best attempt to render all characters, regardless of the value specified by lang.

For instance, if characters from the Greek alphabet appear in the midst of English text:

<P><Q lang="en">Her super-powers were the result of γ-radiation,</Q> he explained.</P>

Firstly a user agent should try to render the English content in an appropriate manner (for example, in its handling the quotation marks) and secondly the user agent must make a best attempt to render γ even though it is not an English character.

Of course, a special 'tag' in xhtml and wap could be defined in order to communicate the dialogue language to the user of the phone or the communication terminal.

FIG. 5 shows a display sequence for a message reply scenario in a communication terminal according to the invention. An SMS message is received by the phone 1, and when the user instructs the phone to display the received message, the message is displayed as the first picture of FIG. 5. The message text is displayed in a text filed 51 of the display. The sender is identified in a header 50—for example, as a phone-number (Calling Line Identification Presentation—CLIR) or as a name label. The name label can be found in the phonebook memory 41c based on the CLIR. Two soft key labels 52 and 53 for the two soft keys 8 are displayed below the text field 51.

When the user presses the soft key 8 providing the reply-option, the processor starts analyzing the received message. Usually no language information is included, so the processor has to do the test as indicated above with reference to table 2. The predictive editor of the phone is set to Danish, but the phone identifies the dialogue to be in English. Therefore the phone sets the language of the predictive editor to be English as indicated in the header 50 of the second picture of FIG. 5. The user starts to write a response in the text field 51 using the editor, and a cursor bar 54 indicates where in the text the next character will be inserted. The soft key labels 52 and 53 indicates the present functionality of the two soft keys 8.

The language setting for the predictive editor based on the test is only valid for the dialogue session. After the termination of the dialogue session, the directory language set by the user or by the SIM card will apply again.

FIG. 6 shows a display sequence for an Internet based chat scenario in a communication terminal according to the invention. Via the WAP application 44 the phone enters a chat session. In the first picture of FIG. 6 a chat history is received and displayed as paragraphs 61 in a text field of the display. The Internet address is identified in a header 60—e.g. as an MMM address or a WWW address. Two soft key labels 62 and 63 for the two soft keys 8 are displayed below the text field 61.

When the user presses the soft key 8 providing the reply-option, the processor starts analyzing the received message. Language information may be included; otherwise the processor has to do the test as discussed above. The predictive editor of the phone is set to Danish, but the phone identifies the dialogue to be in English. Therefore the phone sets the language of the predictive editor to be English as indicated in the header 64 of the second picture of FIG. 6. The user starts to write an input 65 in the text field using the editor, and a cursor bar 66 indicates where in the text the next character will be inserted. The soft key labels 62 and 63 indicates the present functionality of the two soft keys 8.

Figure 7:
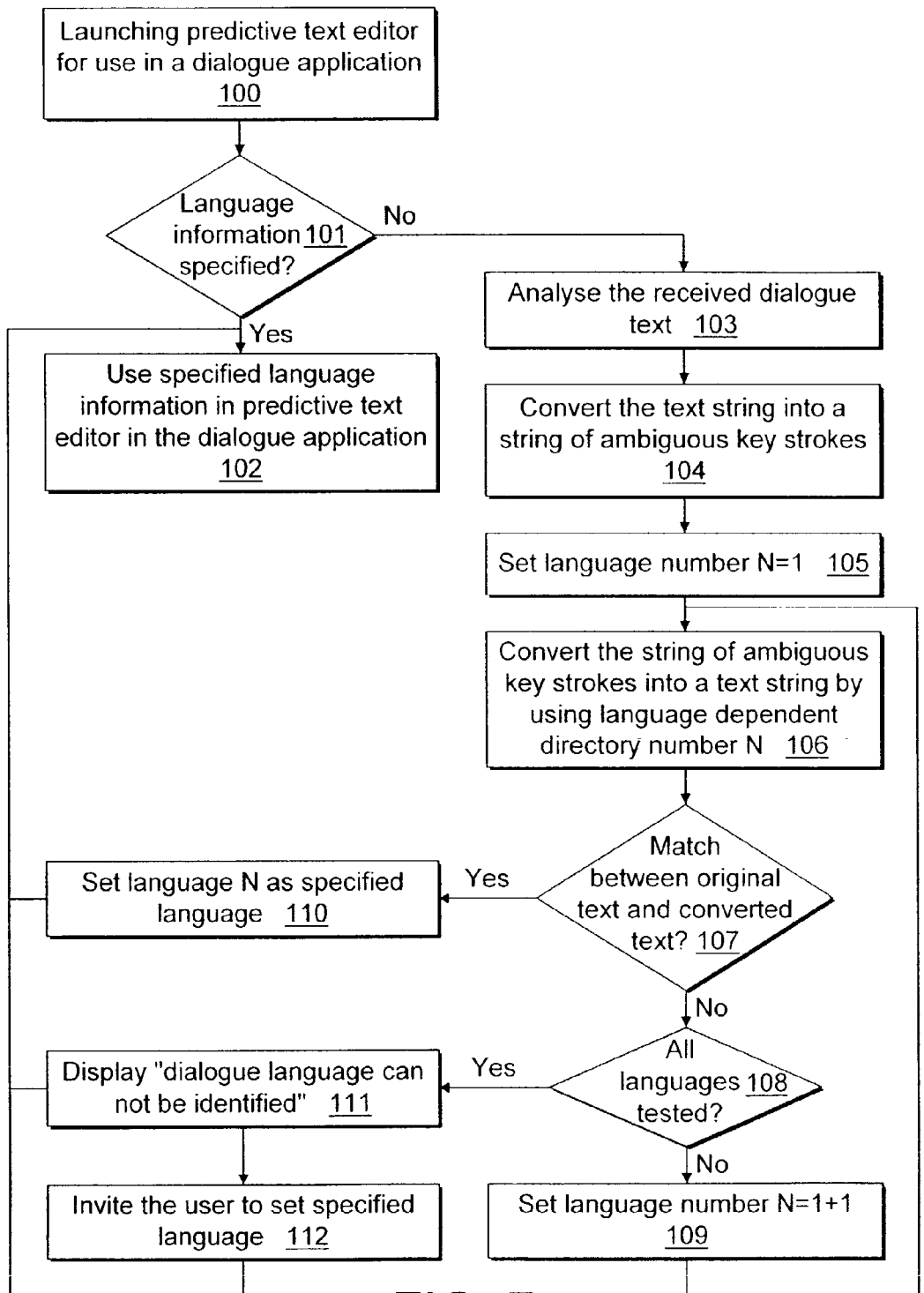
FIG. 7 shows a flow diagram for determining a dialogue language in a communication terminal according to the invention.

FIG. 7 shows a flow diagram for determining a dialogue language in a communication terminal according to the invention. When the processor 18 has to launch the predictive text editor at step 100 in response to the user instruction to reply to an incoming dialogue invitation, the processor 18 has to identify the language directory to be used by the predictive editor. In step 101 the processor 18 controls whether a language indicator or a language tag is included in the dialogue invitation. If this is the case the processor 18 uses the identified language in stop 102 for the dialogue (the entire session).

If the dialogue invitation does not include any language indication, the processor 18 starts to analyse the received text in step 103. First, in step 104 the processor 18 converts the text string into a string of ambiguous keystrokes by means of the converter 45.

If for example Danish is the preferred language set by the user, the processor sets this language as the first language, N=1. Then the processor will set English as the second language, N=2. When a language has been selected as the preferred language for the predictive editor, the processor may set a flag indicating this setting, and these languages will be set as third and further languages. In step 105 N is set to 1.

In step 106, the string of ambiguous key strokes provided in step 104 is fed to the predictive editor using directory N. In step 107 the processor 18 controls whether the conversion provided in step 106 matches with the received dialogue text. If this is the case, the language N is set as specified language in step 110 and used in the predictive editor at step 102.

If there is no match at step 107, the processor 18 controls at step 108 whether all possible languages have been tested. If not, the processor increases N at step 109 and tries to find match for the next language. These steps are repeated until a match is deemed to be present at step 107 or it is deemed that no match is available at all at step 108.

If no match is available at step 108 and all languages have been tested, the user is informed at step 111 that the dialogue language could not be identified. At step 112 the processor 18 invites the user to manually set the dialogue language for predictive editor or to select to use multi-tapping for text entry.

The invention claimed is:

1. A method performed by a communication terminal, the method comprising:
   receiving a dialogue input containing text;
   identifying language information from processing of the text of the dialogue input;
   setting a directory language for a predictive editor according to the identified language information; and
   using the predictive editor for entering input in the dialogue,
   wherein the predictive editor is used in a message related dialogue application, and wherein identifying the language information comprises analyzing the dialogue input text, said analyzing of the dialogue input text comprising:
   converting words in the dialogue input text into strings of ambiguous key strokes;
   generating a candidate list for the dialogue input text words using a language dependent directory based on said strings of ambiguous key strokes;
   comparing said candidate list with the original dialogue input text words; and
   selecting said language dependent directory in the dialogue application when said comparison indicates a substantial matching between the dialogue input text words and the corresponding candidate lists.

2. The method of claim 1, wherein the dialogue application is one of a mobile Internet related application and a message related application.

3. The method of claim 1, wherein the directory language set for the predictive editor is different from a default language directory designated for the dialogue application.

4. The method of claim 1, wherein the received dialogue input containing text comprises Extensible Hypertext Markup Language (XHTML) content received from a content provider over a network connection.

5. A communication terminal comprising:
   a transceiver unit through which said communication terminal is connected with a network and being able to receive a dialogue input containing text;
   a processor controlling at least some operations of the communication terminal; and
   memory storing computer executable instructions that, when executed by the processor, cause the communication terminal to perform a method comprising:
   identifying language information in said dialogue input by processing the text of the dialogue input;
   selecting a directory language for a predictive editor according to the identified language information; and
   using the selected directory language to transform a string of ambiguous keystrokes entered as text for a message related dialogue application assocaited with the predictive editor,
   wherein identifying the language information comprises:
   converting the dialogue input text into strings of ambiguous key strokes;
   generating a candidate list for the dialogue input text using a language dependent directory based on said strings of ambiguous key strokes;
   comparing said candidate list with the original dialogue input text; and
   selecting said language dependent directory in the dialogue application when said comparison indicates a substantial matching between the dialogue input text and the corresponding candidate lists.

6. The communication terminal of claim 5, wherein the dialogue application is one of a mobile Internet related application and a message related application running on the communication terminal.

7. The communication terminal of claim 5, wherein the directory language selected for the predictive editor is different than a default language directory of the communication terminal.

8. The communication terminal of claim 5, wherein the text of the dialogue input comprises Extensible Hypertext Markup Language (XHTML) content received from a content provider over a network connection.

9. A communication device comprising:
a processor controlling at least some operations of the electronic device;
memory storing computer executable instructions that, when executed by the processor, cause the communication device to perform a method comprising:
receiving at a predictive editor a dialogue input containing text;
identifying one or more text words from the received text;
converting the one or more text words into one or more corresponding strings of ambiguous keystrokes;
for each string of ambiguous keystrokes, searching a plurality of language directories to identify a set of candidates within each language directory matching the string of ambiguous keystrokes;
based on the searching, identifying language information for the text of the dialogue input; and
setting a directory language for the predictive editor according to the identified language information.

10. The communication device of claim 9, wherein the predictive editor is used in one of a mobile Internet related application and a message related application running on the electronic device.

11. The communication device of claim 9, wherein the directory language set for the predictive editor is different than a default language directory for the communication device.

12. The communication device of claim 11, the method further comprising:
determining that a dialogue session associated with the predictive editor has been terminated;
identifying a new application running on the communication device; and
setting the directory language for the new application according to the default language directory for the electronic device.

13. The communication device of claim 9, wherein the received dialogue input containing text comprises Extensible Hypertext Markup Language (XHTML) content received from a content provider over a network connection.

14. The communication device of claim 9, the method further comprising:
receiving user input at the communication device, the user input corresponding to a string of ambiguous keystrokes; and
transforming the user input into text, based on the directory language set for the predictive editor.

15. The communication device of claim 9, the method further comprising:
determining a default language directory for the communication device,
wherein searching the plurality of language directories comprises searching a language directory corresponding to the default language directory prior to searching any other language directory.

16. The communication device of claim 9, wherein identifying the language information comprises identifying one of the searched language directories for which a matching candidate was found for at least 90% of the strings of ambiguous keystrokes.

17. A method performed by a communication device, the method comprising:
receiving at a predictive editor a dialogue input containing text;
identifying one or more text words from the received text;
converting the one or more text words into one or more corresponding strings of ambiguous keystrokes;
for each string of ambiguous keystrokes, searching a plurality of language directories to identify a set of candidates within each language directory matching the string of ambiguous keystrokes;
based on the searching, identifying language information for the text of the dialogue input; and
setting a directory language for the predictive editor according to the identified language information.

18. The method of claim 17, wherein the predictive editor is used in one of a mobile Internet related application and a message related application.

19. The method of claim 17, wherein the directory language set for the predictive editor is different than a default language directory for an electronic device on which the predictive editor is executing.

20. The method of claim 19, further comprising:
determining that a dialogue session associated with the predictive editor has been terminated;
identifying a new application running on the electronic device; and
setting the directory language for the new application according to the default language directory for the electronic device.

21. The method of claim 17, wherein the received dialogue input containing text comprises Extensible Hypertext Markup Language (XHTML) content received from a content provider over a network connection.

22. The method of claim 17, further comprising:
receiving user input corresponding to a string of ambiguous keystrokes; and
transforming the user input into text, based on the directory language set for the predictive editor.

23. The method of claim 17, further comprising:
determining a default language directory for an electronic device on which the predictive editor is executing,
wherein searching the plurality of language directories comprises searching a language directory corresponding to the default language directory prior to searching any other language directory.

24. The method of claim 17, wherein identifying the language information comprises identifying one of the searched language directories for which a matching candidate was found for at least 90% of the strings of ambiguous keystrokes.

* * * * *